United States Patent [19]

Motz

[11] 3,742,448
[45] June 26, 1973

[54] VEHICLE SEAT BELT WARNING AND CONTROL SYSTEM

[75] Inventor: Phillip R. Motz, Milwaukee, Wis.

[73] Assignee: General Motors Corporation, Detroit, Mich.

[22] Filed: Feb. 2, 1972

[21] Appl. No.: 222,840

[52] U.S. Cl.............. 340/52 E, 340/278, 180/82 C
[51] Int. Cl. ........................................... B60r 21/10
[58] Field of Search ............... 340/52 R, 52 E, 278; 307/10 SB; 180/82 C

[56] References Cited
UNITED STATES PATENTS
3,269,483  8/1966  Garner, Jr...................... 340/278 X Primary Examiner—Alvin H. Waring
Attorney—Eugene W. Christen, Albert F. Duke et al.

[57] ABSTRACT

A starter control circuit including first logic means comprising a delay flip-flop and a gate connected with a seat belt in-use responsive switch and a seat occupancy responsive switch for providing a START logic level output when and only when the seat belts are in use and are placed in use subsequent to seat occupancy. Second logic means including a delay flip-flop and additional gates are provided for producing a START output which is independent of seat belt operation once a START output is initially obtained from the first logic means. Third logic means are provided for producing a START output in response to a START output from either of said first or second logic means. A starter circuit interrupt relay and control transistor responsive to the output of the third logic means is provided for controlling the starting of the vehicle. Visual and delayed audible warning means are included for providing a warning signal if the seat belts are unfastened after the vehicle has been placed in motion. Additional seat occupancy responsive switch means and seat belt in-use responsive switch means are provided for actuation by passengers of the vehicle upon seat occupancy and belt use and logic circuitry responsive to operation of these switches is connected as inputs to the gate in the first logic means and prevent starting of the vehicle if the passenger seats are occupied unless the seat belts are fastened subsequent to seat occupancy.

6 Claims, 1 Drawing Figure

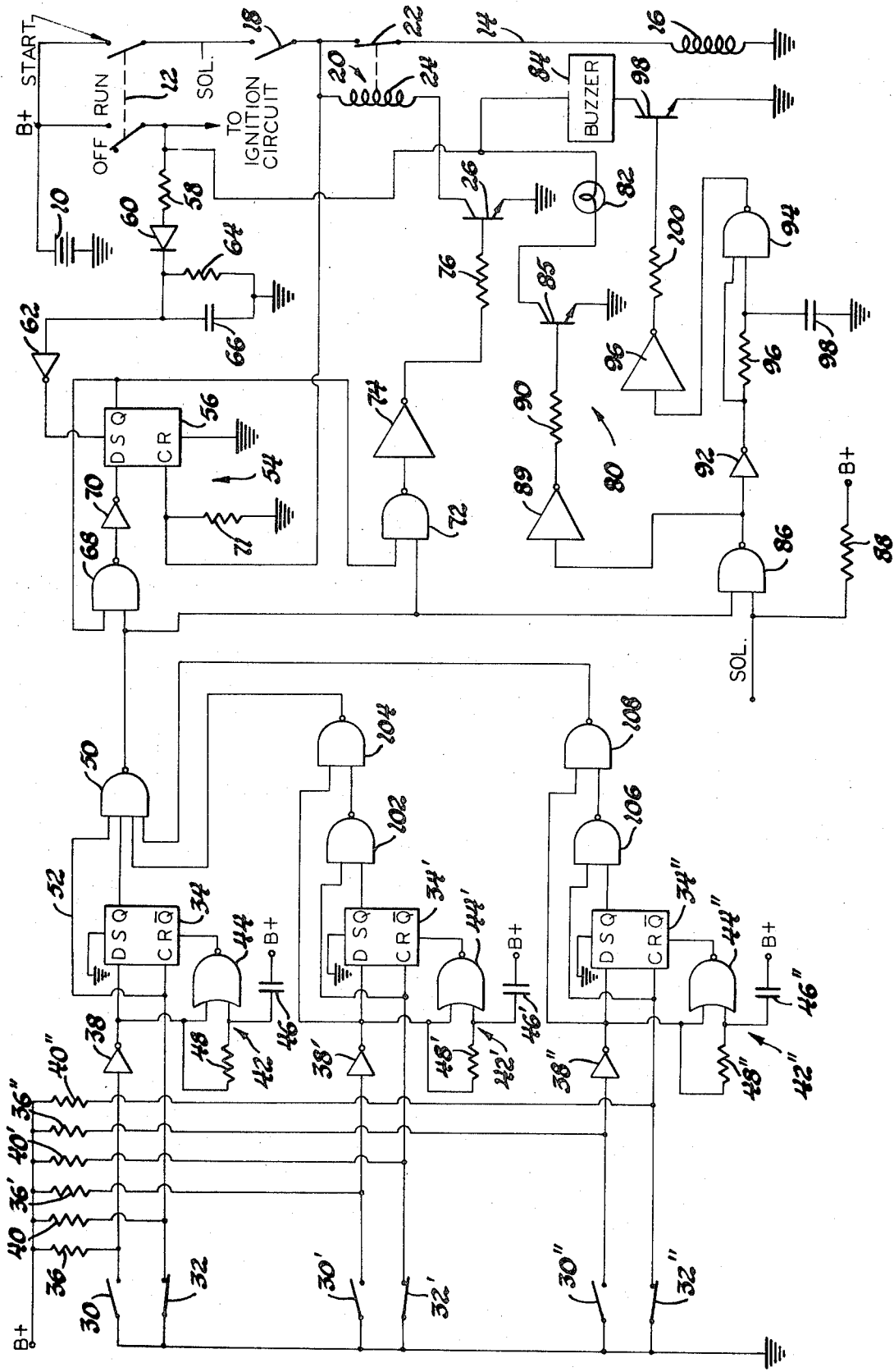

VEHICLE SEAT BELT WARNING AND CONTROL SYSTEM

This invention relates to circuitry for preventing starting of a motor vehicle unless the vehicle seat belts are fastened and more particularly, to a circuit which prevents vehicle starting unless the seat belts are placed in use subsequent to occupancy of the vehicle seat.

It is an object of the present invention to provide an improved seat belt and starter circuit interlock system for preventing starting of the vehicle unless the vehicle occupants follow the sequence of occupying the vehicle seat and subsequently fastening their seat belts.

It is another object of the present invention to provide such a seat belt and starter circuit interlock system which permits restarting of the vehicle, in the event of engine stall, independently of the condition of the seat belts.

It is another object of the present invention to provide a system as aforementioned which provides visual and delayed audible warnings if the seat belts are unfastened while the vehicle is in motion.

A more complete understanding of the present invention may be had from the following detailed description which should be read in conjunction with the single figure showing a preferred embodiment of the invention.

Referring now to the single drawing, the system of the present invention includes a vehicle battery 10 providing a source of direct current. The positive terminal of the battery is designated B+ while the negative terminal is grounded. An ignition switch generally designated 12 is manually actuable from a normally "Off" position as shown to a START position connecting a starter circuit generally designated 14 to the battery 10. The ignition switch 12 is biased to return from the START position to a RUN position connecting the ignition circuit (not shown) to the battery 10. The starter circuit includes a starter motor solenoid coil 16 serially connected with a transmission selector switch 18. The switch 18 is closed whenever the transmission selector is placed in a Park or Neutral position and is otherwise open.

An interrupt relay generally designated 20 includes a normally closed armature 22 connected in series with the starter solenoid coil 16 and a relay coil 24 which when energized actuates the armature 22 to a position opening the circuit to the starter solenoid coil 16. Energization of the relay coil 24 is under the control of a transistor 26 which in the embodiment shown is an NPN conductivity type transistor. The emitter-collector electrodes of the transistor 26 connect one side of the relay coil 24 to ground while the other side of the coil 24 is connected to the battery 10 through the ignition switch 12 and the transmission selector switch 18. The transistor 26 is rendered conductive upon the application of a positive or "1" logic level voltage to the base of the transistor and is rendered nonconductive upon the application of ground or "0" logic level to the base thereof. Since the solenoid coil 16 is energizable to start the vehicle only when a logic "0" is applied to the base of transistor 26 in the further description hereinafter a logic "0" is used interchangeably with the designation START. Conversely, since the application of a logic "1" to the base of transistor 26 will prevent starting of the vehicle, a logic "1" is used interchangeably with the designation $\overline{START}$.

The conduction of transistor 26 is under the control of logic circuitry connected with the ignition switch 12, a normally open seat occupancy responsive switch 30 and a normally closed seat belt switch 32. The switch 30 is appropriately located so that it closes when the vehicle driver sits in the vehicle seat while the switch 32 opens whenever the driver places his seat belt in use. The switch 32 may respond to buckling of the seat belt or may be associated with the seat belt retractor so as to close when the belt is fully extended from the retractor. In any event, opening of the switch 32 is indicative of placement of the driver's seat belt in use. The switch 30 is hereinafter referred to as a seat switch while the switch 32 is hereinafter referred to as a belt switch. Additional seat switches 30' and 30'' and belt switches 32' and 32'' are similarly associated with seats occupied by passengers of the vehicle and seat belts provided for passenger use.

A conventional D type flip-flop such as RCA-CD4013 is generally designated 34 and is responsive to the operation of the switches 30 and 32.

The function of the flip-flop 34 is to produce an output which will permit starting of the vehicle only if the belt switch 32 is actuated subsequent to actuation of the seat switch 30. As is well known by those skilled in the art the logic level present at the D input of a D type flip-flop is transferred to the Q output on the leading edge of a positive going pulse applied to the clock or C input. One side of the seat switch 30 is grounded while the other side is connected to B+ through a pull-up resistor 36 and the D input of the flip-flop 34 through an inverter 38. One side of the belt switch 32 is grounded while the other side is connected to B+ through a pull-up resistor 40 and is directly connected to the clock input of the flip-flop 34. Thus when the driver's seat is not occupied the switch 30 is open and a logic "0" is applied to the D input of the flip-flop 34 and when the driver's seat is occupied the switch 30 is closed and a logic "1" is applied to the D input of the flip-flop 34. When the driver's seat belts are not in use the switch 32 is closed and a logic "0" is applied to the C input of the flip-flop 34 and when the seat belts are placed in use the switch 32 is opened and a logic "1" is applied to the C input of the flip-flop 34. A time delay network generally designated 42 is connected to the reset input R of the flip-flop 34 and is responsive to operation of the seat switch 30. The network 42 includes a two input NOR gate 44 having one input connected to the output of the inverter 38 and the other input connected to B+ through a capacitor 46. The output of the gate 44 is connected to the Reset input R of the flip-flop 34. A resistor 48 is connected across the input terminals of the gate 44. The flip-flop 34 is reset upon the application of a logic "1" to its Reset input which produces a logic "0" at its Q output. As long as a logic "1" input is applied to the Reset input of the flip-flop 34 the Q output is held in a logic "0" state. When the seat switch 30 closes a logic "1" input is applied to the gate 44 and the resistor 48 charging the capacitor 46 and producing a logic "0" output releasing the flip-flop 34. Whenever the seat switch is opened a logic "0" appears at the output of the inverter 38 permitting the capacitor 46 to discharge through the resistor 48. After about 5 seconds a logic "0" appears at both inputs of the gate 44 producing the logic "1" output to reset the flip-flop 34. The 5 second delay between opening of the seat switch 30 and reset of the flip-flop 34 prevents inadvertent resetting due to normal movements of the driver during seat occupancy.

A four input NAND gate 50 has one input connected to the Q output of flip-flop 34 and a second input connected with the belt switch 32 through the conductor 52. The gate 50 produces a logic "0" output only if all inputs are a logic "1." For the moment it will be assumed that no passengers are present in the vehicle. As will be explained hereinafter, under these circumstances the other two inputs to the gate 50 which are connected with logic circuitry associated with the switches 30', 32' and 30'', 32'' are a logic "1." Thus, with regards to the driver's actions the gate 50 will produce a logic "0" or START logic level output only if the driver has his belt fastened, i.e., the switch 32 is opened and the seat belt was placed in use after the driver occupied the seat, i.e., the seat switch 30 closed prior to opening of the switch 32. This results from the fact that the flip-flop 34 is held in a Reset condition wherein a logic "0" appears at the Q output regardless of the condition of the belt switch 32 until the Reset on flip-flop 34 is released by occupancy of the seat and resultant closure of the seat switch 32.

The output of the gate 50 is connected with lock-in circuitry generally designated 54. The function of the circuitry 54 is to provide a START output which is independent of seat belt use once a START output has been obtained from the gate 50 in order to insure that the vehicle may be immediately restarted in the event the engine stalls. The lock-in circuitry 54 includes a D type flip-flop 56 having its set input connected to the ignition switch run position through a resistor 58, a diode 60 and an inverter 62. The junction between the diode 60 and the inverter 62 is connected to ground through a time delay network comprising a parallel connected resistor 64 and capacitor 66. Whenever the ignition switch 12 is in the Off position a logic "1" is applied to the set input of the flip-flop 56 producing and maintaining a logic "1" at the Q output of the flip-flop 56. When the ignition switch 12 is placed in the RUN or START position a logic "0" appears at the set terminal of the flip-flop 56 a short time interval thereafter, such as 1 microsecond determined by the charging rate of the capacitor 66. The Q output of the flip-flop 56 is connected as one input to a NAND gate 68, the other input of which is connected to the output of the gate 50. The output of the gate 68 is inverted by an inverter 70 and applied to the D input of the flip-flop 56. The clock input of the flip-flop 56 is connected to ground through a resistor 72 and to the low side of the transmission selector switch 18. If the output of the gate 50 is a START or logic "0" level, the output of the gate 68 will be a logic "1" which is inverted to a logic "0" at the D input of the flip-flop 56. Consequently, when the ignition switch is placed in a START position the logic "0" at the D input is transferred by the clock input to the Q output of the flip-flop 56 which is then fed back through the gate 68 to maintain a logic "0" at the D input of the flip-flop 56.

The Q output of the flip-flop 56 and the output of the gate 50 are applied as inputs to a two-input NAND gate 72, the output of which is inverted by inverter 74 and applied to the base of transistor 26 through a resistor 76. The output of the flip-flop 56 is normally set at a $\overline{START}$ logic level when the ignition switch 12 is open. If a $\overline{START}$ or a logic "1" level is obtained from the gate 50 the two logic "1" inputs to the gate 72 produce a logic "0" output which is inverted by the inverter 74 to produce a $\overline{START}$ or logic "1" level at the base of transistor 26. Consequently, when the ignition switch 12 is placed in the START position, the transistor 26 is rendered conductive energizing the relay coil 24 which draws in the armature 22 breaking the circuit to the solenoid coil 16 and preventing starting of the vehicle.

If on the other hand, a logic "0" or START logic level output is obtained from the gate 50 indicative of the driver having buckled his seat belt subsequent to occupying the seat, then a logic "0" input is applied to the gate 72 producing a logic "1" output which is inverted by the inverter 74 to produce a logic "0" or START logic level at the base of transistor 26 thereby preventing conduction of the transistor 26. The armature 22 of the relay 20 accordingly, remains in the circuit closing position permitting energization of the starter solenoid coil upon closure of the ignition switch 12 to the START position. In addition, the START logic level output of the gate 50 applied to the gate 68 produces a logic "0" level at the D input of the flip-flop 56. Consequently, when the ignition switch is moved to the START position applying a logic "1" to the clock input of the flip-flop 56 the Q output of the flip-flop 56 switches to a logic "0" which is fed back through the gate 68 to the D input so that any subsequent clocking of the flip-flop 56 i.e., movement of the ignition switch 12 from the RUN position to the START position, produces a START output from the Q output of the flip-flop 56. Since any START input to the gate 72 will produce a START logic level at the base of transistor 26, it will be apparent that once a START logic level output is obtained from the gate 50 the circuitry 54 maintains a START input to the gate 72 independently of the gate 50 thereby permitting restarting of the vehicle in the event of engine stall without regard to whether the seat belts are in use. However, as previously noted, in order for this independent START logic level output to be maintained the ignition switch 12 must not be moved to the Off position.

Warning circuitry generally designated 80 is provided for both visually and audibly indicating any subsequent unfastening of the seat belt after the vehicle has been placed in motion. The circuitry 80 includes a visual warning device such as an indicator lamp 82 and an audible indicating device such as a buzzer 84. The lamp 82 is connected across the source 10 through the ignition switch 12 and a switching transistor 85. A two input NAND gate 86 has one input connected to the output of the gate 50 and the other input connected to the high side of the transmission selector switch 18 and also to B+ through a pull-up resistor 88. A logic "1" is applied to this input from B+ whenever the selector switch 18 is open and a logic "0" is applied through the coil 16 to this input whenever the selector switch 18 is closed. The output of the gate 86 is inverted by an inverter 89 and applied to the base of transistor 85 through a resistor 90. The output of the gate 86 is also applied through an inverter 92 to one input of a two input NAND gate 94 and to the other input of the gate 94 through a resistor 96. The other input of the gate 94 is tied to ground through a capacitor 98. The output of the gate 94 is inverted by inverter 96 and applied to the base of the transistor 98 through a resistor 100. The emitter-collector electrodes of the transistor 98 connect the buzzer 84 across the source 10. If the selector switch 18 is in other than the Park or Neutral position and the seat belt switch 32 is closed, i.e., the seat belt is not in use, then a logic "0" is applied to the input of the gate 50 producing a logic "1" output. The two logic "1" inputs to the gate 86 produce a logic "0" output which is inverted to a logic "1" to render the transistor 84 conductive and energize the lamp 82. The capacitor 98 normally holds one of the inputs of the gate 94 in a logic "0," however, when the output of the gate 86 switches to a logic "0" the capacitor 98 begins to charge from the logic "1" output of the inverter 92 through the resistor 96. The resistor 96 and the capacitor 98 are selected so that approximately 30 seconds is required to charge the capacitor 98 to the threshold level of the gate 94. When this occurs all inputs to the gate 94 are logic "1's" producing a logic "0" output and a logic "1" input to the base of transistor 98 rendering this transistor conductive energizing the buzzer 84.

The switches 30', 30'' and 32' and 32'' as previously indicated, respond to seat occupancy by passengers and passenger use of the seat belts respectively. Circuitry identical with that previously described in connection with the switches 30 and 32 is provided for the switches and are designated by ' and '' numerals. In addition, a pair of NAND gates 102 and 104, and 106 and 108 are provided which perform an AND/OR function. Gate 102 has inputs connected with the Q output of the flip-flop 34' and the belt switch 32'. Gate 104 has one input connected to the output of the gate 102 and the other input connected with the seat switch 30' through the inverter 38'. The output of the gate 104 is connected as one input to the gate 50. If the seat associated with the switch 30' is not occupied, a logic "0" appears at the output of the inverter 38' and the input of the gate 108 producing a logic "1" at the output. On the other hand, if the seat associated with the switch 30' is occupied by a passenger and subsequent to occupation thereof, the belt switch 32' is opened by the passenger placing the seat belt in use, both inputs to the gate 102 are a logic "1" producing a logic "0" input to the gate 104 and therefore a logic "1" output. Thus a logic "1" output is obtained if the seat is occupied by a passenger AND the passenger's seat belt is placed in use subsequent to occupation of the sear OR the seat is not occupied. On the other hand, a logic "0" output from the gate 104, and consequently a $\overline{\text{START}}$ output from the gate 50, is obtained only if the seat is occupied, closing the switch 30', and the seat belts are not in use, i.e., the switch 32' is closed, or if the seat belts are buckled prior to seat occupancy.

The gates 106 and 108 perform identical functions with regards to the switches 30'' and 32'' that the gates 102 and 104 perform with regard to the switches 30' and 32'. While only two passenger responsive switches are shown it will be apparent that additional switches and additional logic circuitry responsive thereto may be added as additional inputs to the gate 50.

Since the warning circuitry 80 is disabled when the transmission selector switch 18 is in other than the Park or Neutral position it will be apparent that the warning lamp 82 and buzzer 82 are energized only on these occasions. Since the driver will be informed that either his seat belt or one of the passengers' seat belts is not fastened by the fact that the vehicle will not start, the circuitry 80 is inform intended to inform the driver that one of the seat belts have been unfastened after the vehicle has been placed in motion. The circuitry 80 may be easily modified to provide a warning at all times by disconnecting the input to the gate 86 from the high side of the switch 18, thus providing a logic "1" at one of the inputs to the gate 86 at all times through the resistor 88.

Having thus described my invention, what I claim is:

1. A control and indicator system for use with a motor vehicle provided with a source of direct current, a starter circuit, an ignition circuit, an ignition switch actuable from a normally open position to a START position connecting said source to said starter circuit and said ignition circuit and biased to return from said START position to a RUN position connecting said source to said ignition circuit, seat occupancy responsive switch means and seat belt in-use responsive switch means, said control and indicator system comprising:

first logic means connected with said seat switch means and said seat belt switch means for producing a START logic level output when and only when said seat occupancy responsive switch means are actuated prior to actuation of said seat belt in-use responsive switch means, said logic means producing a $\overline{\text{START}}$ logic level output when said seat belt in-use responsive switch means are deactuated or when said seat occupancy responsive switch means are deactuated, second logic means connected with said first logic means and said starter and ignition circuit for producing a START logic level output in response to actuation of said ignition switch to said START position subsequent to production of said START logic level output from said first logic means, said second logic means producing a $\overline{\text{START}}$ logic level output in response to deactuation of said ignition switch to said normally open position, third logic means for controlling energization of said starter circuit and permitting energization of said starter circuit only in response to said START logic level output of either of said first or second logic means, visual indicator means, audible indicator means, fourth logic means responsive to the output of said first logic means for energizing one of said indicator means in response to said $\overline{\text{START}}$ logic level output of said first logic means, time delay means responsive to the output of said fourth logic means for energizing the other of said indicator means a predetermined interval of time after energization of said one of said indicator means.

2. A control and indicator system for use with a motor vehicle provided with a source of direct current, starter circuit including a transmission selector switch which is closed when the transmission selector is in neutral, an ignition circuit, an ignition switch actuable from a normally open position to a START position connecting said source to said starter circuit and said ignition circuit and biased to return from said START position to a RUN position connecting said source to said ignition circuit, seat occupancy responsive switch means and seat belt in-use responsive switch means, said control and indicator system comprising:

first logic means connected with seat switch means and said seat belt switch means for producing a START logic level output when and only when said seat occupancy responsive switch means are actuated prior to actuation of said seat belt in-use responsive switch means, said first logic means producing a $\overline{\text{START}}$ logic level output when said seat belt in-use responsive switch means are deactuated or when said seat occupancy responsive switch means are deactuated, said first logic means including time delay means responsive to operation of said seat occupancy responsive switch means for delaying the production of the $\overline{\text{START}}$ logic level output produced thereby for a predetermined interval of time after deactuation of said seat occupancy responsive switch means, second logic means normally producing said $\overline{\text{START}}$ logic level output but actuable to produce said START logic level output in response to actuation of said ignition switch to said START position subsequent to production of said START logic level output from said first logic means, third logic means for permitting energization of said starter circuit in response to said START logic level output of either of said first or second logic means, visual indicator means connected to said source when said ignition switch is in said RUN position, audible indicator means connected to said source in parallel with said ignition switch, fourth logic means responsive to the output of said first logic means and the position of said transmission selector switch means for energizing said visual and audible indicator means in response to said $\overline{\text{START}}$ logic level output of said first logic means while said transmission selector switch means is open, said fourth logic means including time delay means for delaying energization of said audible indicator means for a predetermined interval of time after energization of said visual indicator means.

3. A control and indicator system for use with motor vehicle provided with a source of direct current, a starter circuit including a transmission selector switch which is closed when the transmission selector is in a Neutral or Park position, an ignition circuit, an ignition switch actuable from a normally open position to a START position connecting said source to said starter circuit and said ignition circuit, means biasing said ignition switch to return from said START position to a RUN position connecting said source to said ignition circuit, seat occupancy responsive switch means and seat belt in-use responsive switch means, said control and indicator system comprising:

a first delay flip-flop having a data input, a clock input, an initializing input and an output, time delay means connecting said initializing input with said seat occupancy responsive switch means for setting the output of said first delay flip-flop to a logic "0" in response to deactuation of said seat occupancy responsive switch means for a predetermined time interval, means connecting said seat occupancy responsive switch means to said data input, means connecting said seat belt in-use responsive switch means to said clock input whereby the output of said first delay flip-flop is switched to a logic "1" when and only when said seat occupancy responsive switch means are actuated prior to actuation of said seat belt in-use responsive switch means, first gate means connected with the output of said first delay flip-flop and said seat belt in-use responsive switch means for producing a logic "0" output only when the output of said first delay flip-flop is a logic "1" and said seat belt is in use, a second delay flip-flop having a data input, a clock input, an initializing input and an output, means connecting said initializing input to said ignition switch for setting the output of said second delay flip-flop to a logic "1" when said ignition switch is open, second gate means connecting said data input of said second delay flip-flop with the output of said first gate means and the output of said second delay flip-flop whereby the data input to said second delay flip-flop is a logic "0" when either input to said second gate means is a logic "0," means connecting the clock input of said second delay flip-flop with said starter circuit whereby the output of said second delay flip-flop switches to a logic "0" when said ignition switch is placed in said START position subsequent to production of a logic "0" output from said first gate means, third gate means having inputs connected with the outputs of said first gate means and said second delay flip-flop for producing a logic "0" output in response to a logic "0" input from either said first gate means or said second delay flip-flop, means permitting energization of said starter circuit only in response to a logic "0" output from said third gate means, visual indicator means, audible indicator means, fourth gate means connected with the output of said first gate means and said starter circuit for energizing said visual indicator means when a logic "1" output is obtained from said first gate means and said transmission selector switch is open, time delay means responsive to the output of said fourth gate means for energizing said audible indicator means a predetermined interval of time after energization of said visual indicator means.

4. A control system for use with a motor vehicle provided with a source of direct current, a starter circuit, an ignition switch actuable from a normally open position to a START position connecting said source to said starter circuit, seat occupancy responsive switch means and seat belt in-use responsive switch means, said control system comprising:

a delay flip-flop having a data input, a clock input, an initializing input, and an output, means connecting said initializing input with said seat occupancy responsive switch means for setting and maintaining the output of said delay flip-flop at a $\overline{\text{START}}$ logic level when and for as long as said seat occupancy responsive switch means are deactuated, means connecting said seat occupancy responsive means to said data input and effective to establish a START logic level at said data input when the seat is occupied, and means connecting said seat belt in-use responsive switch means to said clock input whereby the output of said delay flip-flop is switched to a START logic level when and only when said seat occupancy responsive switch means are actuated prior to actuation of said seat belt in-use responsive switch means, starter circuit interrupt means responsive to production of said $\overline{\text{START}}$ logic level output for preventing energization of said starter circuit and responsive to said START logic level output for permitting energization of said starter circuit.

5. The system defined in claim 4 further including a second delay flip-flop having a data input, a clock input, an initializing input and an output, means connecting said initializing input to said ignition switch for setting the output of said second delay flip-flop to a $\overline{\text{START}}$ logic level when said ignition switch is open, gate means connecting said data input of said second delay flip-flop with the output of said first and second delay flip-flops whereby the data input to said second delay flip-flop is at a START logic level when either input to said gate means is a START logic level, means connecting the clock input of said second delay flip-flop with said starter circuit whereby the output of said second delay flip-flop switches to a START logic level when said ignition switch is placed in said START position subsequent to production of a START logic level output from said first delay flip-flop and is maintained at said START logic level as long as said ignition switch is closed, additional gate means interconnecting the output of said first and second flip-flops with said starter circuit interrupt means whereby said starter circuit is energizable in response to a START output from either said first or said second delay flip-flops.

6. A control and indicator system for use with a motor vehicle provided with a source of direct current, a starter circuit, and an ignition switch actuable from a normally open position to a START position connecting said source to said starter circuit, seat occupancy responsive switch means and seat belt in-use responsive switch means, said control and indicator system comprising:

a delay flip-flop having a data input, a clock input, an initializing input, and an output, means connecting said initializing input with said seat occupancy responsive switch means for setting and maintaining the output of said delay flip-flop at a first logic level as long as said seat occupancy responsive switch means is deactuated, means connecting said seat belt in-use responsive switch means to said clock input, means for establishing a second logic level at said data input whereby the output of said delay flip-flop is switched to said second logic level when and only when said seat occupancy responsive switch means are actuated prior to actuation of said seat belt in-use responsive switch means, AND function performing gate means producing a $\overline{\text{WARN}}$ logic level output when said seat belt is in use and the output of said flip-flop is at said second logic level and otherwise producing a WARN logic level output, starter circuit interrupt means responsive to the production of said WARN logic level output for preventing energization of said starter circuit and responsive to said $\overline{\text{WARN}}$ logic level output to permit energization of said starter circuit, indicator means energizable in response to said WARN logic level output, said means interconnecting said seat occupancy responsive means and said initializing input including time delay means for delaying the setting of said first logic level for a predetermined interval of time subsequent to deactuation of said seat occupancy responsive switch means.

* * * * *